(12) United States Patent
Khatri et al.

(10) Patent No.: US 10,430,367 B1
(45) Date of Patent: Oct. 1, 2019

(54) SYSTEMS AND METHODS FOR OPTIMAL PLACEMENT OF INFORMATION HANDLING RESOURCE

(71) Applicant: Dell Products L.P., Round Rock, TX (US)

(72) Inventors: Mukund P. Khatri, Austin, TX (US); Srinivas Giri Raju Gowda, Santa Clara, CA (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 16/034,001

(22) Filed: Jul. 12, 2018

(51) Int. Cl.
*G06F 13/40* (2006.01)
*G06F 9/50* (2006.01)

(52) U.S. Cl.
CPC .......... *G06F 13/4081* (2013.01); *G06F 9/505* (2013.01); *G06F 9/5011* (2013.01); *G06F 9/5016* (2013.01); *G06F 9/5027* (2013.01); *G06F 9/5044* (2013.01); *G06F 9/5083* (2013.01)

(58) Field of Classification Search
CPC .. G06F 13/4081; G06F 9/5083; G06F 9/5011; G06F 9/5016; G06F 9/5027; G06F 9/5044; G06F 9/505
See application file for complete search history.

(56) References Cited

U.S. PATENT DOCUMENTS

| | | | | |
|---|---|---|---|---|
| 6,754,747 B2 * | 6/2004 | Locklear | ............... | G06F 11/325 710/100 |
| 6,961,794 B2 * | 11/2005 | Atherton | ............. | G06F 11/3409 710/301 |
| 2004/0260857 A1 * | 12/2004 | Henderson | ............ | G06F 11/008 710/313 |
| 2005/0034027 A1 * | 2/2005 | Hamilton, II | ......... | G06F 9/5011 714/43 |
| 2005/0246517 A1 * | 11/2005 | Volentine | ............ | G06F 13/4234 713/1 |
| 2006/0184480 A1 * | 8/2006 | Ayyar | ................. | G06F 13/4081 706/45 |
| 2008/0001952 A1 * | 1/2008 | Srinivasan | ................ | G06T 1/20 345/502 |
| 2008/0028117 A1 * | 1/2008 | Nijhawan | ............... | G06F 12/06 710/302 |
| 2014/0068603 A1 * | 3/2014 | Tsirkin | .................. | G06F 9/5077 718/1 |

(Continued)

*Primary Examiner* — Glenn A. Auve
(74) *Attorney, Agent, or Firm* — Jackson Walker L.L.P.

(57) ABSTRACT

In accordance with embodiments of the present disclosure, an information handling system may include: a plurality of processor sockets, each processor socket configured to receive a respective processor; a plurality of slots, each slot configured to receive a corresponding information handling resource; and a program of instructions embodied in non-transitory computer-readable media. The program of instructions may be configured to, when read and executed by one of the respective processors identify a processing node for handling a processing load of an information handling resource to be inserted into one of the slots, determine slots within a proximity domain of the processing node, and identify the slots within the proximity domain of the processing node as optimal slots for insertion of the information handling resource to be inserted.

18 Claims, 2 Drawing Sheets

(56) References Cited

U.S. PATENT DOCUMENTS

| | | | |
|---|---|---|---|
| 2014/0245295 A1* | 8/2014 | Tsirkin | G06F 9/45533 718/1 |
| 2015/0186171 A1* | 7/2015 | Kotta | G06F 9/45533 718/1 |
| 2016/0210049 A1* | 7/2016 | van Riel | G06F 12/0284 |
| 2017/0168715 A1* | 6/2017 | Eshwarappa | G06F 3/0604 |
| 2017/0371777 A1* | 12/2017 | Kim | G06F 3/0604 |
| 2018/0101486 A1* | 4/2018 | Lu | G06F 9/45558 |

* cited by examiner

SYSTEMS AND METHODS FOR OPTIMAL PLACEMENT OF INFORMATION HANDLING RESOURCE

TECHNICAL FIELD

The present disclosure relates in general to information handling systems, and more particularly to methods and systems for optimal placement of an information handling resource in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are evolving to host an increasing number of Non-Volatile Memory Express (NVMe) storage drives. Apart from the performance benefits of using NVMe drives, NVMe drives allow the flexibility for hot-pluggable adding and removing of such drives. However, in multi-socket servers, performance of an NVMe drive may be dependent upon which processor's Peripheral Component Interconnect Express (PCIe) port to which the NVMe drive is attached relative to the processor in which a driver for the NVMe drive is executing. Using traditional approaches, no mechanism exists to recognize the optimum slot to hot insert an NVMe drive or NVMe controller. In other words, using traditional approaches, a user is given no indication in recognizing an optimal slot to insert an NVMe drive or controller in order to achieve desired system behavior.

SUMMARY

In accordance with the teachings of the present disclosure, the disadvantages and problems associated with existing approaches to placement of an information handling resource in an information handling system may be reduced or eliminated.

In accordance with embodiments of the present disclosure, an information handling system may include: a plurality of processor sockets, each processor socket configured to receive a respective processor; a plurality of slots, each slot configured to receive a corresponding information handling resource; and a program of instructions embodied in non-transitory computer-readable media. The program of instructions may be configured to, when read and executed by one of the respective processors identify a processing node for handling a processing load of an information handling resource to be inserted into one of the slots, determine slots within a proximity domain of the processing node, and identify the slots within the proximity domain of the processing node as optimal slots for insertion of the information handling resource to be inserted.

In accordance with these and other embodiments of the present disclosure, a method for use in an information handling system comprising a plurality of processor sockets, each processor socket configured to receive a respective processor, and a plurality of slots, each slot configured to receive a corresponding information handling resource, may comprise identifying a processing node for handling a processing load of an information handling resource to be inserted into one of the slots, determining slots within a proximity domain of the processing node, and identifying the slots within the proximity domain of the processing node as optimal slots for insertion of the information handling resource to be inserted.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in an information handling system comprising a plurality of processor sockets, each processor socket configured to receive a respective host processor, and a plurality of slots, each slot configured to receive a corresponding information handling resource: identify a processing node for handling a processing load of an information handling resource to be inserted into one of the slots; determine slots within a proximity domain of the processing node; and identify the slots within the proximity domain of the processing node as optimal slots for insertion of the information handling resource to be inserted.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
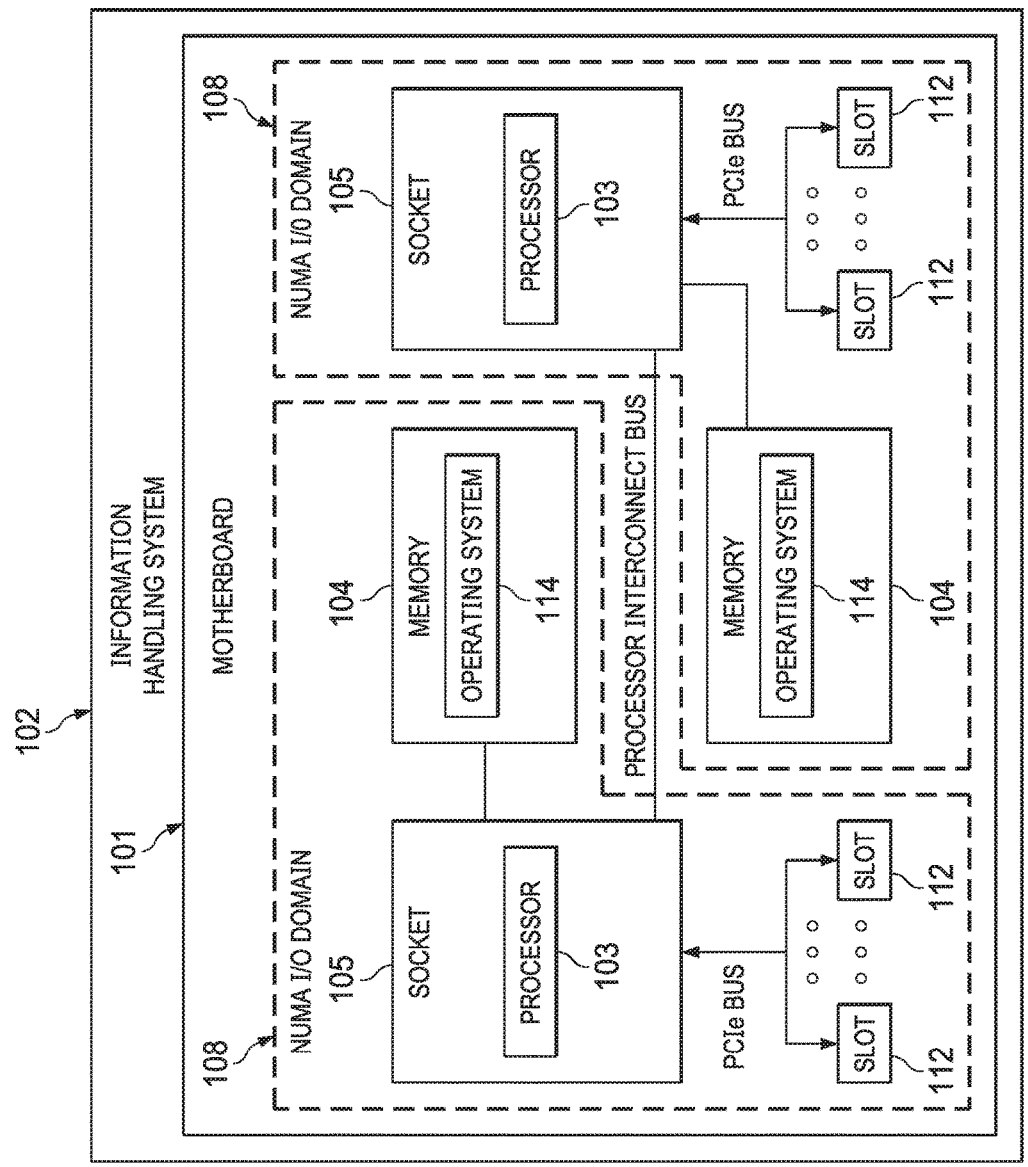
FIG. 1 illustrates a block diagram of an example information handling system, in accordance with embodiments of the present disclosure.
Figure 2:
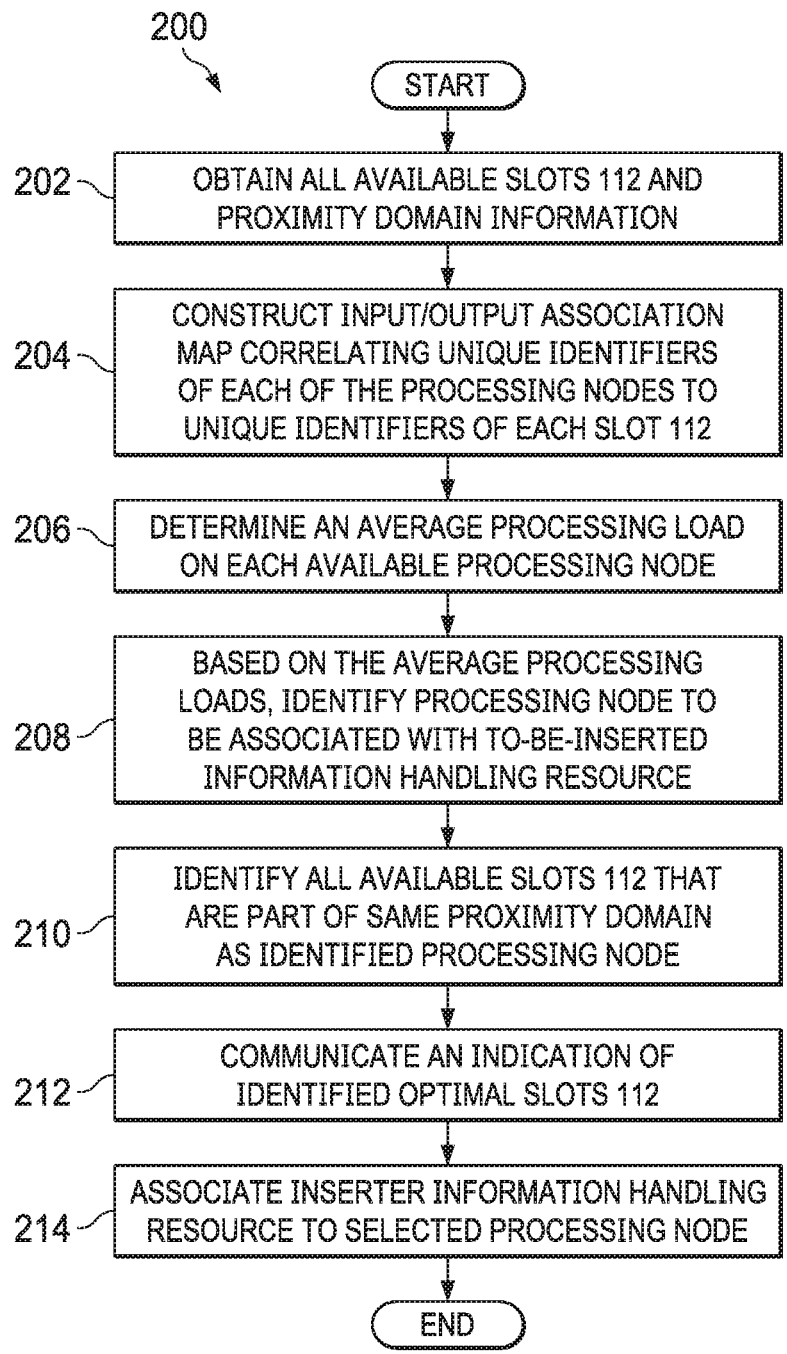
FIG. 2 illustrates a flow chart of an example method for optimal placement of a to-be-inserted information handling resource, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an information handling system 102. In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include a motherboard 101. Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a plurality of sockets 105, a memories 104, and a plurality of slots 112.

Each socket 105 may comprise any suitable system, device, or apparatus for electrically and mechanically mating a processor 103 to motherboard 101. A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102. As shown, processors 103 may be coupled to one another via an inter-socket bus (e.g., a PCIe bus).

Each memory 104 may be communicatively coupled to processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to information handling system 102 is turned off. As shown in FIG. 1, a memory 104 may have stored thereon an operating system (OS) 114.

OS 114 may comprise any program of executable instructions, or aggregation of programs of executable instructions, configured to manage and/or control the allocation and usage of hardware resources such as memory, CPU time, disk space, and input and output devices, and provide an interface between such hardware resources and application programs hosted by OS 114. Active portions of OS 114 may be transferred to memory 104 for execution by processor 103.

Each slot 112 may include a connector (e.g., a receptacle) to provide structural support for receiving a corresponding information handling resource within such slot in order to electrically couple such information handling resource to other electric or electronic components external to such slot 112. For example, each slot may be configured to receive a storage resource. A storage resource may include a hard disk drive, magnetic tape library, optical disk drive, magneto-optical disk drive, compact disk drive, compact disk array, disk array controller, and/or any other system, apparatus or device operable to store media. In particular embodiments, a storage resource may comprise a PCIe device, such as an NVMe storage resource. In such embodiments, a PCIe controller may not be fixed in an information handling system chipset as are traditional storage controllers of traditional storage devices. Instead, PCIe controllers exist on the PCIe (e.g., NVMe storage devices themselves). As shown in FIG. 1, a PCIe bus may couple a slot 112 to a corresponding processor 103.

In FIG. 1, a processor 103 and devices disposed in slots 112 "directly" coupled to such processor may form part of a Non-Uniform Memory Access (NUMA) input/output (I/O) domain 108. In operation, a processor 103 may communicate directly with devices within its NUMA I/O domain 108, or indirectly via another processor 103 to devices in another NUMA I/O domain 108. However, processor and device performance may be less efficient when communicating across NUMA I/O domains 108 as compared with communicating within the same NUMA I/O domain 108.

In operation, OS 114 or an application executing upon OS 114 may identify a slot 112 for optimal placement of a to-be-inserted information handling resource (e.g., NVMe drive), in order to achieve optimal load distribution across available processors 103. In order to make such identification, OS 114 (or an application execution thereupon) may consider at least the following factors:

1. Available processing nodes (e.g., NUMA nodes), wherein a processing node comprises a processor 103, or in the case of multi-core processors, a processing node comprises a core of a processor 103.

2. Average load on each processing node in each of the proximity domains (e.g., NUMA I/O domains).

3. Association/proximity of slots 112 to available processing nodes.

Method 200 as described below provides additional illustration into the identification of a slot 112 for optimal placement of a to-be-inserted information handling resource.

FIG. 2 illustrates a flow chart of an example method 200 for optimal placement of a to-be-inserted information handling resource, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, OS 114 (or an application executing thereon) may, responsive to an indication of a desire to insert an information handling resource, obtain all available slots 112 and their associated proximity domain information. For example, to implement step 202, a new Advanced Configuration and Power Interface (ACPI) construct _PCISLOTS may be defined that, for a given processor core or processor unique identifier, returns all of the available slots 112 (e.g., NVMe PCIe slots) that are part of the same proximity (e.g., NUMA I/O) domain. Such construct _PCISLOTS may use proximity domain identifier (_PXM) information embedded in an ACPI along with a static resource affinity table (SRAT) to identify input/output association and/or proximity with processor 103 in the same proximity (e.g., NUMA I/O) domain.

At step 204, OS 114 (or an application executing thereon) may (e.g., using the _PCISLOTS construct defined above) construct an input/output association map that correlates unique identifiers of each of the processing nodes to unique identifiers of each slot 112. In other words, such map sets forth the input/output proximity between processing nodes and slots 112 in the same proximity (e.g., NUMA I/O) domain. In some embodiments, such input/output association map may include only unpopulated slots 112. Thus, if a slot 112 is populated, it may be omitted from the input/output association map.

At step 206, OS 114 (or an application executing thereon) may determine an average processing load on each available processing node. At step 208, based on the average processing loads, OS 114 (or an application executing thereon) may identify a processing node to be associated with the to-be-inserted information handling resource. Any suitable mechanism may be used to identify the desired processing node. For example, a processing node may be identified that has an average load below a predefined threshold, and if no such processing node is found, then the processing node with the lowest average load may be identified. In addition, the mechanism for identifying the desired processing node need not be based only on processing load. As an example, a preference may exist to hot add information handling resources into a slot 112 associated with a particular socket 105 or alternate the load on sockets 105 with each subsequent insertion of an additional information handling resource.

At step 210, OS 114 (or an application executing thereon) may (e.g., using the _PCISLOTS construct defined above) identify all available slots 112 (e.g., PCIe/NVMe slots) that are part of the same proximity domain as the identified processing node.

At step 212, OS 114 (or an application executing thereon) may communicate an indication to a user of the optimal slots 112 identified in step 210 for insertion of the to-be-inserted information handling resource. For example, in some embodiments, OS 114 (or an application executing thereon) may cause light emitting diodes (LEDs) or other visual indicators associated with the optimal slots 112 to activate. As a specific example, a new ACPI construct _SETBAY may be defined which is configured to activate the drive bay LEDs for the determined optimal slots 112.

At step 214, in response to a user hot-inserting an information handling resource into an indicated slot 112, OS 114 (or an application executing thereon) may associate the information handling resource to the selected processing node (e.g., OS 114 may pin the NVMe worker thread for such information handling resource to the selected processing node). After completion of step 214, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a plurality of processor sockets, each processor socket configured to receive a respective processor;
a plurality of slots, each slot configured to receive a corresponding information handling resource, wherein the information handling resources are Non-Volatile Memory Express storage drives; and
a program of instructions embodied in non-transitory computer-readable media and configured to, when read and executed by one of the respective processors:
identify a processing node for handling a processing load of an information handling resource to be inserted into one of the slots;
determine slots within a proximity domain of the processing node; and
identify the slots within the proximity domain of the processing node as optimal slots for insertion of the information handling resource to be inserted.

2. The information handling system of claim 1, wherein the program of instructions is configured to identify the processing node for handling the processing load based on an average processing load for each of the processing node and all other available processing nodes of the information handling system.

3. The information handling system of claim 1, wherein determining slots within the proximity domain of the processing node is based on an association map correlating unique identifiers of the processing node to unique identifiers of slots in a proximity domain of the processing node.

4. The information handling system of claim 1, wherein the program of instructions is configured to communicate to a user of the information handling system an indication of the optimal slots for insertion of the information handling resource.

5. The information handling system of claim 4, wherein the indication is a visual indication.

6. The information handling system of claim 5, wherein the indication is provided via illumination of a light.

7. A method comprising, in an information handling system comprising a plurality of processor sockets, each processor socket configured to receive a respective processor, and a plurality of slots, each slot configured to receive a corresponding information handling resource, wherein the information handling resources are Non-Volatile Memory Express storage drives:
identifying a processing node for handling a processing load of an information handling resource to be inserted into one of the slots;
determining slots within a proximity domain of the processing node; and
identifying the slots within the proximity domain of the processing node as optimal slots for insertion of the information handling resource to be inserted.

8. The method of claim 7, further comprising identifying the processing node for handling the processing load based on an average processing load for each of the processing node and all other available processing nodes of the information handling system.

9. The method of claim 7, wherein determining slots within the proximity domain of the processing node is based on an association map correlating unique identifiers of the processing node to unique identifiers of slots in a proximity domain of the processing node.

10. The method of claim 7, further comprising communicating to a user of the information handling system an indication of the optimal slots for insertion of the information handling resource.

11. The method of claim 10, wherein the indication is a visual indication.

12. The method of claim 11, wherein the indication is provided via illumination of a light.

13. An article of manufacture comprising:
a non-transitory computer-readable medium; and
computer-executable instructions carried on the computer-readable medium, the instructions readable by a processor, the instructions, when read and executed, for causing the processor to, in an information handling system comprising a plurality of processor sockets, each processor socket configured to receive a respective host processor, and a plurality of slots, each slot configured to receive a corresponding information handling resource, wherein the information handling resources are Non-Volatile Memory Express storage drives:
identify a processing node for handling a processing load of an information handling resource to be inserted into one of the slots;
determine slots within a proximity domain of the processing node; and
identify the slots within the proximity domain of the processing node as optimal slots for insertion of the information handling resource to be inserted.

14. The article of claim 13, the instructions for further causing the processor to identify the processing node for handling the processing load based on an average processing load for each of the processing node and all other available processing nodes of the information handling system.

15. The article of claim 13, wherein determining slots within the proximity domain of the processing node is based on an association map correlating unique identifiers of the processing node to unique identifiers of slots in a proximity domain of the processing node.

16. The article of claim 13, the instructions for further causing the processor to communicate to a user of the information handling system an indication of the optimal slots for insertion of the information handling resource.

17. The article of claim 16, wherein the indication is a visual indication.

18. The article of claim 17, wherein the indication is provided via illumination of a light.

\* \* \* \* \*